(12) United States Patent
Smed

(10) Patent No.: US 9,746,124 B2
(45) Date of Patent: Aug. 29, 2017

(54) ADJUSTABLE MULTI-MONITOR SUPPORT ASSEMBLY

(76) Inventor: Ole Falk Smed, Calgary (CA)

( * ) Notice: Subject to any disclaimer, the term of this patent is extended or adjusted under 35 U.S.C. 154(b) by 0 days.

(21) Appl. No.: 13/487,667

(22) Filed: Jun. 4, 2012

(65) Prior Publication Data

US 2013/0320170 A1    Dec. 5, 2013

(51) Int. Cl.
*F16M 13/02* (2006.01)
*F16M 11/10* (2006.01)
*F16M 11/20* (2006.01)
*F16M 11/24* (2006.01)

(52) U.S. Cl.
CPC ......... *F16M 11/10* (2013.01); *F16M 11/2014* (2013.01); *F16M 11/2092* (2013.01); *F16M 11/24* (2013.01); *F16M 13/02* (2013.01); *F16M 2200/048* (2013.01); *F16M 2200/063* (2013.01)

(58) Field of Classification Search
CPC ...... F16M 11/04; F16M 11/041; F16M 11/18; F16M 11/2085; F16M 11/10; F16M 11/2014; F16M 11/2092; F16M 13/02; F16M 11/24
USPC .... 248/917–923, 276.1, 282.1, 284.1, 176.1; 361/679.01, 679.02, 679.21, 679.22, 361/679.09, 681, 682, 683
See application file for complete search history.

(56) References Cited

U.S. PATENT DOCUMENTS

| | | | |
|---|---|---|---|
| 6,695,270 B1 * | 2/2004 | Smed | F16M 11/10 248/274.1 |
| 7,061,754 B2 * | 6/2006 | Moscovitch | F16M 11/10 248/917 |
| 7,331,551 B2 * | 2/2008 | Oddsen, Jr. | F16M 11/10 248/278.1 |
| 7,369,401 B1 * | 5/2008 | Floersch | F16M 11/08 292/301 |
| 7,922,132 B2 * | 4/2011 | Saez | F16M 11/041 248/124.1 |
| 8,000,090 B2 * | 8/2011 | Moscovitch | F16M 11/105 361/679.04 |
| 8,083,189 B2 * | 12/2011 | Sun | F16M 11/08 248/122.1 |
| D660,308 S * | 5/2012 | Huang | D14/452 |
| 8,282,052 B2 * | 10/2012 | Huang | F16M 11/045 248/125.1 |
| RE43,921 E * | 1/2013 | Smed | F16M 11/10 248/124.1 |
| 8,342,462 B2 * | 1/2013 | Sapper | F16M 11/10 248/124.1 |
| 8,596,599 B1 * | 12/2013 | Carson | B60R 11/0235 211/26 |

(Continued)

*Primary Examiner* — Muhammad Ijaz
(74) *Attorney, Agent, or Firm* — Carl A. Hjort, III

(57) ABSTRACT

An adjustable multi-monitor support assembly is shown and described. The assembly includes at least one monitor arm, having a proximate end adapted to be attached to a work surface and a distal end and at least one pivot neck secured to the distal end of the monitor arm. Also provided is a hollow monitor support rail, having at least one shuttle aperture therein, being adapted to receive a plurality of monitor mounting brackets for supporting a plurality of monitors and at least one shuttle, having a top and a bottom end, and at least two glides wherein the glides are attached to the shuttle at the top and bottom ends. The shuttle is disposed within the hollow monitor support rail and aligned with the shuttle aperture and secured to the pivot neck.

22 Claims, 2 Drawing Sheets

(56) References Cited

U.S. PATENT DOCUMENTS

| | | | | |
|---|---|---|---|---|
| 8,717,506 | B2* | 5/2014 | Austin | F16M 11/125 348/836 |
| 2003/0015632 | A1* | 1/2003 | Dunn | A47B 81/065 248/122.1 |
| 2004/0011938 | A1* | 1/2004 | Oddsen, Jr. | F16M 11/10 248/393 |
| 2006/0065795 | A1* | 3/2006 | Blackburn | F16M 11/14 248/122.1 |
| 2007/0084978 | A1* | 4/2007 | Martin | F16M 11/105 248/176.1 |
| 2007/0205340 | A1* | 9/2007 | Jung | F16M 11/24 248/125.9 |
| 2009/0173847 | A1* | 7/2009 | Dittmer | F16M 11/041 248/125.2 |
| 2010/0128423 | A1* | 5/2010 | Moscovitch | F16M 11/041 361/679.01 |
| 2013/0320170 | A1* | 12/2013 | Smed | F16M 11/10 248/274.1 |
| 2014/0117182 | A1* | 5/2014 | Blackburn | F16M 11/18 248/298.1 |
| 2015/0342351 | A1* | 12/2015 | Hung | G06F 1/1601 211/26 |
| 2016/0281915 | A1* | 9/2016 | Bowman | F16M 11/045 |

* cited by examiner

ADJUSTABLE MULTI-MONITOR SUPPORT ASSEMBLY

DETAILED DESCRIPTION OF THE DRAWINGS

Embodiments of an adjustable multi-monitor support assembly are shown and described. Generally, the adjustable multi-monitor support assembly includes at least one monitor arm, having a proximate end adapted to be attached to a work surface and a distal end; at least one pivot neck, secured to the monitor arm at the distal end thereof; a hollow monitor support rail, having at least one shuttle aperture therein, and being adapted to receive a plurality of monitor mounting brackets for supporting a plurality of monitors; at least one shuttle, having a top and a bottom end, and at least two glides wherein the glides are attached to the shuttle at the top and bottom ends; and wherein the at least one shuttle is disposed within the hollow monitor support rail and aligned with the shuttle aperture and secured to the pivot neck.

Figure 1:
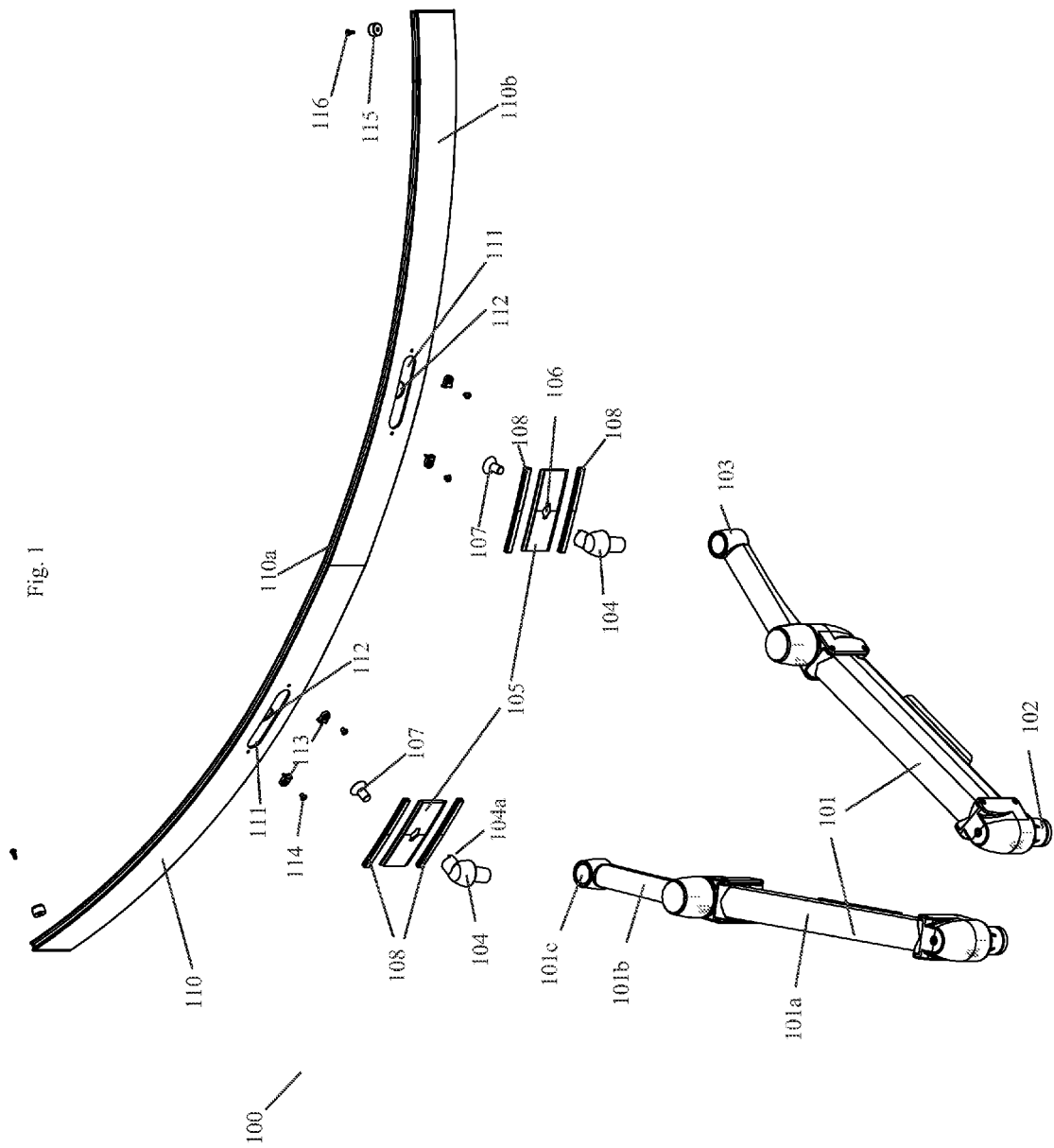
FIG. 1 is an exploded view of the adjustable multi-monitor support assembly.

FIG. 1 shows an exploded view of the adjustable multi-monitor support assembly 100. One or more monitor arms 101 are provided. It should be appreciated that the number of monitor arms provided depends on the weight and quantity of monitors to be supported. As shown in FIG. 1, two monitor arms 101 may be provided, but in certain applications one monitor may be provided and in yet other applications, three or more monitor arms may be provided. Monitor arms 101 have a proximate end 102 and a distal end 103. Proximate end 102 may be secured to a work surface. By way of example, and without limitation, a hub may be provided, wherein said hub has a monitor arm receiving member and the proximate end 102 is received in the receiving member. Alternatively, other devices (not shown) which secure the proximate end 102 to a work surface may be provided, said devices including a bolt-through mount, a c-clamp mount and other devices known in the art for securing a monitor arm to a work surface. Monitor arms 101 may be adjustable height monitor arms. Disposed within an adjustable portion 101a may be a gas spring or other device which allows the height of the monitor arm 101 to be adjusted. Monitor arms 101 may also be provided with an extension arm 101b. Provided in the extension arm 101b is aperture 101c, into which the pivot neck may be received, as will be discussed in greater detail infra.

Pivot necks 104 are also provided in the assembly. It should be appreciated that the number of pivot necks 104 provided will correspond to the number of monitor arms 101 in the assembly. Thus, as shown in FIG. 1, two pivot necks are provided to correspond to the two monitor arms. In cases where one or three or more monitor arms are provided, a corresponding number of pivot necks will be provided. Pivot neck 104 is may be received in aperture 101c and secured in aperture 101c with a washer and fastener (not shown) secured from the underside of aperture 101c. Pivot neck 104 may be provided with a key 104a disposed on the end thereof. The key 104a engages with a keyed hole on the shuttle as will be described infra. The key 104a prevents rotation of the pivot necks 104 with respect to the shuttle. The pivot neck 104 may be provided with a tapped hole to receive a fastener for securing the shuttle to the pivot neck 104.

Also provided are shuttles 105. As with the pivot necks and monitor arms, it should be appreciated that the number of shuttles 105 provided will correspond to the number of monitor arms 101 and pivot necks 104 in the assembly. Thus, as shown in FIG. 1, two shuttles are provided to correspond to the two pivot necks and the two monitor arms. In cases where one or three or more monitor arms are provided, a corresponding number of shuttles will be provided. Disposed in the center of each shuttle 105 is keyed hole 106. Keyed hole 106 has a central hole portion and two additional voids on each side of the central hole portion. The keys 104a on the pivot neck 104 fit into the voids in keyed hole 106. In this way, rotation of pivot neck 104 with respect to shuttle 105 is prevented. Shuttle 105 may be secured to pivot neck 104 with fastener 107.

Shuttle 105 has top and bottom ends. Attached to the top and bottom ends of shuttle 105 are glides 108. Glides 108 are friction fit onto the top and bottom ends of shuttle 105. The glides 108 may also be attached to the shuttle 105 by adhesive or other means known in the art. Glides 108 are preferably made of nylon, acetal or other polymers. The purpose of glides 108 is to reduce the friction encountered by the shuttle 105, as it slides through the hollow monitor support rail.

Hollow monitor support rail 110 is also provided. Hollow monitor support rail is fabricated from steel or aluminum or any other suitable material known in the art. Hollow monitor support rail 110 is provided with a top channel 110a and a corresponding bottom channel (not shown). As will be discussed in greater detail with respect to FIG. 2, the top and bottom channels on the hollow monitor support rail 110 engage with monitor mounting brackets. Hollow monitor support rail has a rear face 110b.

Disposed on the rear face 110b of hollow monitor support rail 110 are shuttle apertures 111. As with the shuttles, the pivot necks and the monitor arms, it should be appreciated that the number of shuttle apertures 111 provided will correspond to the number of monitor arms 101, pivot necks 104, and shuttles 105 in the assembly. Thus, as shown in FIG. 1, two shuttle apertures are provided to correspond to the two shuttles in engagement with the two pivot necks and the two monitor arms. In cases where one or three or more monitor arms are provided, a corresponding number of shuttle apertures will be provided. When assembled, the shuttle 105 slides into an end of the hollow monitor support rail and is aligned with the shuttle aperture 111. An assembly hole 112 is also provided on the front face (not shown) of the hollow monitor support rail 110. Assembly hole 112 provides access so that fastener 107 can be threaded through keyed hole 106 in shuttle 105 and further threaded into pivot neck 104. Once assembled in this manner, the assembly hole 112 provides no further function in the device. When assembled, shuttle 105 can slide back and forth inside the hollow monitor support rail, wherein the limit of the sliding is defined by the length of the elongated shuttle aperture 111. When pivot neck 104 comes into contact with the end of shuttle aperture 111, then the sliding of the shuttle is stopped in that direction. Optionally, stop members 113 secured to the hollow monitor support rail 110 by fasteners 114 may be provided. The purpose of stop members 113 is to cushion the impact of pivot neck 104 against the side of shuttle aperture 111, to prevent damage to these components and also to prevent the collision of those members from making a noise if they come into contact. Also optionally provided are bumpers 115 secured to the hollow monitor support rail by fasteners 116. Bumpers 115 prevent monitor mounting brackets (not shown) from sliding off the end of hollow monitor support rail 110. This structure will be discussed in greater detail with respect to FIG. 2.

Figure 2:
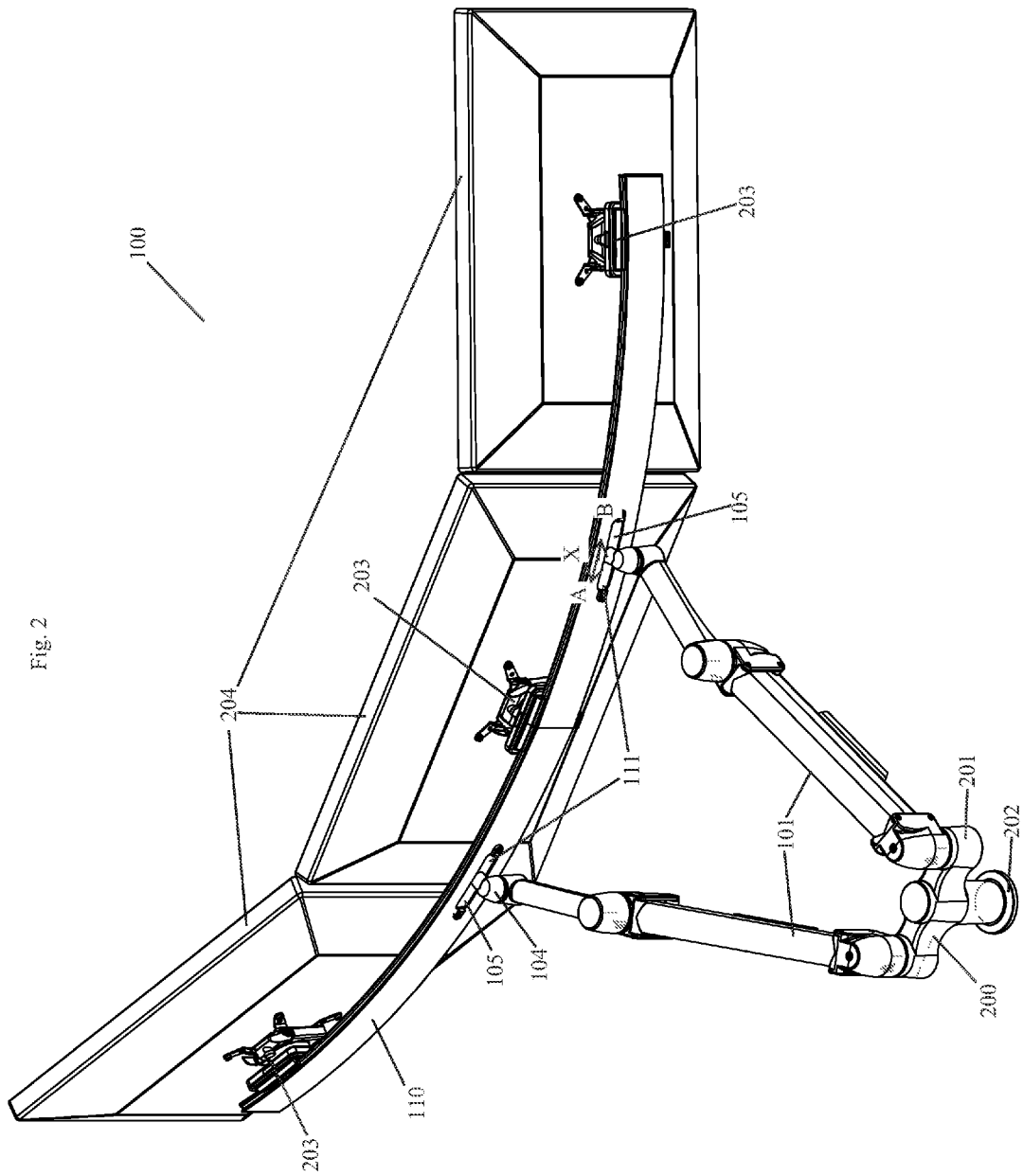
FIG. 2 is an assembled view of the adjustable multi-monitor support assembly.

FIG. 2 shows an assembled view of the adjustable multi-monitor support assembly 100. Like numerals will be used to identify structure already discussed with respect to FIG. 1. Monitor arms 101 are again provided in the assembled view. As can be seen in FIG. 2, monitor arms 101 are received into monitor arm receiving members 201 on hub 200. Bottom end 202 of hub 200 is secured to work surface (not shown). Hub 200 may be secured to the work surface by a bolt-through connection, a c-clamp connection or any other type of connection known in the art. Pivot necks 104 are also shown connected to shuttle 105. A portion of shuttle 105 can be seen in shuttle apertures 111. Stops 113 are also shown. It should be appreciated that shuttle 105 and pivot neck 104 are freely translatable in direction X as shown in FIG. 2. Pivot neck 104 may move between points A and B shown in FIG. 2, and the movement of pivot neck 104 (and attached shuffle 105) are constrained by the ends of shuttle aperture 111. The pivot neck and corresponding shuttle on the other side may translate in this way as well. Monitor mounting brackets 203 are engaged on hollow monitor support rail 110. The monitor mounting brackets 203 ride in top channel 110a and bottom channel (not shown) on hollow monitor support rail 110. Secured to the monitor mounting brackets 203 are monitors 204. Monitor mounting brackets 203 may be adapted to allow the monitor 204 to tilt or otherwise change its angle relative to a user positioned in front of it.

It will be appreciated by those of ordinary skill in the art that, while the forgoing disclosure has been set forth in connection with particular embodiments and examples, the disclosure is not intended to be necessarily so limited, and that numerous other embodiments, examples, uses, modifications and departures from the embodiments, examples and uses described herein are intended to be encompassed b the claims attached hereto. Various features of the disclosure are set forth in the following claims.

I claim:

1. An adjustable multi-monitor support assembly comprising:
   a plurality of monitor arms, each of said monitor arms pivotable relative to each other and having a proximate end adapted to be attached to a work surface and a distal end, wherein each of said plurality of monitor arms is adapted for both vertical and horizontal movement;
   a plurality of pivot necks corresponding to the plurality of monitor arms secured to said plurality of monitor arms at the distal ends thereof, wherein said pivot necks have a vertical axis and a horizontal connection axis, said vertical axis and said horizontal connection axis being disposed perpendicular to each other and wherein said pivot necks are adapted for rotation about the vertical axis therethrough;
   a hollow monitor support rail, said rail having a plurality of elongated shuttle apertures therein, said rail being adapted to receive a plurality of monitor mounting brackets for supporting a plurality of monitors;
   a plurality of shuttles corresponding to respective one of the plurality of monitor arms and pivot necks, said plurality of shuttles having a top and a bottom end, such that rotation of said plurality of pivot necks is prevented with respect to the respective one of the plurality of shuttles;
   a plurality of glides attached to the top and bottom ends of the plurality of shuffles; wherein the shuttles are entirely disposed within the hollow monitor support rail and aligned with the shuttle apertures and secured directly to the pivot necks along the horizontal connection axis.

2. The adjustable multi-monitor support assembly of claim 1 further comprising stop members secured at each end of the shuttle apertures.

3. The adjustable multi-monitor support assembly of claim 1, wherein the glides are formed from a material selected from the group consisting of nylon, acetal and other polymers.

4. The adjustable multi-monitor support assembly of claim 1, wherein the plurality of monitor arms are adjustable height monitor arms.

5. The adjustable multi-monitor support assembly of claim 1, wherein the shuttle has a keyed hole in a center and the pivot neck has a corresponding key which fits in the keyed hole to prevent the pivot neck from rotating relative to the shuttle.

6. The adjustable multi-monitor support assembly of claim 1, wherein bumpers are provided at the ends of the hollow monitor support rail.

7. The adjustable multi-monitor support assembly of claim 1, wherein the proximate ends of the plurality of monitor arms are received in a hub assembly for attachment to the work surface.

8. The adjustable multi-monitor support assembly of claim 1, wherein the monitor mounting brackets are adapted for tilting adjustment of the monitors disposed thereon.

9. An adjustable multi-monitor support assembly comprising:
   a hub adapted to be attached to a work surface, said hub having a plurality of monitor arm receiving members;
   two monitor arms, each of said monitor arms pivotable relative to each other and having a proximate end adapted to be received in the monitor arm receiving member of the hub and a distal end, wherein each of said monitor arms is adapted for both vertical and horizontal movement;
   two pivot necks, each of the pivot necks being secured to the distal end of the respective one of the monitor arms, wherein said pivot necks have a vertical axis and a horizontal connection axis, said vertical axis and said horizontal connection axis being disposed perpendicular to each other and wherein said pivot necks are adapted for rotation about the vertical axis therethrough;
   a hollow monitor support rail, said rail having a plurality of elongated shuttle apertures therein, said rail being adapted to receive a plurality of monitor mounting brackets for supporting a plurality of monitors;
   two shuttles having a top and a bottom end, each of said two shuttles attached to the respective one of the two pivot necks such that rotation of each of said two pivot necks is prevented with respect to the respective one of the plurality of shuttles;
   a plurality of glides attached to the top and bottom ends of the shuttles; wherein the shuttles are entirely disposed within the hollow monitor support rail and aligned with the shuttle apertures and secured directly to the pivot necks along the horizontal connection axis.

10. The adjustable multi-monitor support assembly of claim 9 further comprising stop members secured at each end of the shuttle apertures.

11. The adjustable multi-monitor support assembly of claim 9, wherein the glides are formed from a material selected from the group consisting of nylon, acetal and other polymers.

12. The adjustable multi-monitor support assembly of claim 9, wherein the monitor arms are adjustable height monitor arms.

13. The adjustable multi-monitor support assembly of claim 9, wherein the shuttle has a keyed hole in a center and the pivot neck has a corresponding key which fits in the keyed hole to prevent the pivot neck from rotating relative to the shuttle.

14. The adjustable multi-monitor support assembly of claim 9, wherein bumpers are provided at the ends of the hollow monitor support rail.

15. The adjustable multi-monitor support assembly of claim 9, wherein the monitor mounting brackets are adapted for tilting adjustment of the monitors disposed thereon.

16. An adjustable multi-monitor support assembly comprising:
- at least one monitor arm, said monitor arm having a proximate end adapted to be attached to a work surface and a distal end, wherein said monitor arm is adapted for both vertical and horizontal movement;
- at least one pivot neck, said pivot neck secured to the monitor arm at the distal end thereof, wherein said pivot neck has a vertical axis and a horizontal connection axis, said vertical axis and said horizontal connection axis being disposed perpendicular to each other and wherein said pivot neck is adapted for rotation about the vertical axis therethrough;
- a hollow monitor support rail, said rail having at least one shuttle aperture therein, said rail being adapted to receive a plurality of monitor mounting brackets for supporting a plurality of monitors;
- at least one shuttle, having a top and a bottom end, and at least two glides wherein the glides are attached to the shuttle at the top and bottom ends, wherein the at least one shuttle attached the at least one pivot neck such that rotation of said at least one pivot neck is prevented with respect to the at least one shuttle;
- wherein the at least one shuttle is entirely disposed within the hollow monitor support rail and aligned with the shuttle aperture and secured directly to the pivot neck along the horizontal connection axis; and wherein the shuttle has a keyed hole in a center and the at least one pivot neck has a corresponding key which fits in the keyed hole to prevent the pivot neck from rotating relative to the shuttle.

17. The adjustable multi-monitor support assembly of claim 16 further comprising stop members secured at each end of the shuttle apertures.

18. The adjustable multi-monitor support assembly of claim 16, wherein the glides are formed from a material selected from the group consisting of nylon, acetal and other polymers.

19. The adjustable multi-monitor support assembly of claim 16, wherein the at least one monitor arm is an adjustable height monitor arm.

20. The adjustable multi-monitor support assembly of claim 16, wherein bumpers are provided at the ends of the hollow monitor support rail.

21. The adjustable multi-monitor support assembly of claim 16, wherein the proximate end of the at least one monitor arm is received in a hub assembly for attachment to the work surface.

22. The adjustable multi-monitor support assembly of claim 16, wherein the plurality of monitor mounting brackets are adapted for tilting adjustment of the monitors disposed thereon.

* * * * *